(12) United States Patent
Kaplan (10) Patent No.: US 6,648,387 B2
(45) Date of Patent: Nov. 18, 2003

(54) CANINE WASTE COLLECTION DEVICE AND DISPOSAL METHOD

(76) Inventor: Michael Kaplan, 4461 Kensington Pkwy., Lake Worth, FL (US) 33467

( * ) Notice: Subject to any disclaimer, the term of this patent is extended or adjusted under 35 U.S.C. 154(b) by 0 days.

(21) Appl. No.: 10/036,195

(22) Filed: Dec. 28, 2001

(65) Prior Publication Data

US 2002/0074812 A1 Jun. 20, 2002

Related U.S. Application Data

(63) Continuation-in-part of application No. 09/739,368, filed on Dec. 19, 2000, now Pat. No. 6,386,605.

(51) Int. Cl.[7] ............................. A01K 29/00; E01H 1/12
(52) U.S. Cl. ........................................................ 294/1.5
(58) Field of Search ........................... 294/1.1, 1.3–1.5; 15/257.1, 257.3; 248/99–101; 119/161, 867

(56) References Cited

U.S. PATENT DOCUMENTS

| | | | |
|---|---|---|---|
| 3,358,647 A | * 12/1967 | Wilson | 119/169 |
| 4,010,970 A | 3/1977 | Campbell | |
| 4,019,768 A | 4/1977 | Niece | |
| 4,121,866 A | 10/1978 | Schall et al. | |
| 4,146,259 A | * 3/1979 | Schultz | 294/1.4 |
| 4,149,745 A | * 4/1979 | Willis | 15/257.1 |
| 4,156,400 A | * 5/1979 | Migdal | 119/161 |
| 4,191,414 A | 3/1980 | Dameron | |
| 4,221,415 A | 9/1980 | Ganz | |
| 4,341,410 A | * 7/1982 | Summach | 248/99 |
| 4,457,549 A | * 7/1984 | Lowery | 294/1.4 |
| 4,705,310 A | 11/1987 | Scripter | |
| 4,962,956 A | 10/1990 | Scripter | |
| 5,269,575 A | * 12/1993 | Parvaresh | 294/1.5 |
| 5,683,129 A | * 11/1997 | Jensen | 294/1.5 |
| 5,971,452 A | 10/1999 | Marymor et al. | |
| 6,123,046 A | * 9/2000 | Gemeniano | 119/161 |

* cited by examiner

Primary Examiner—Dean J. Kramer
(74) Attorney, Agent, or Firm—F. Chau & Associates, LLP; Frank V. DeRosa, Esq.

(57) ABSTRACT

A canine waste collection device comprising a handle and a frame member, connected to one end of the handle, wherein the frame member comprises a slotted member for insertably receiving and securing a portion of the disposable paper element, and wherein the frame member is configured for foldably receiving the disposable paper element to form a pouch for receiving waste.

18 Claims, 6 Drawing Sheets

CANINE WASTE COLLECTION DEVICE AND DISPOSAL METHOD

CROSS-REFERENCE TO RELATED APPLICATION

This application is a Continuation-in-Part of U.S. patent application Ser. No. 09/739,368, filed on Dec. 19, 2000, now U.S. Pat. No. 6,386,605 which is incorporated herein by reference.

BACKGROUND

1. Technical Field

The present invention relates generally to a canine waste collection device that utilizes a disposable paper element, such as a paper towel, for collecting excrement and the like. The invention also relates to the loading and release of the paper element from the device. The invention further relates to the disposal of the used paper towel and the waste material.

2. Description of Related Art

Devices to assist in the cleanup of canine waste are known. An example of such a device is described in U.S. Pat. No. 4,221,415, which illustrates a canine waste disposal apparatus having pivotally connected first and second frame elements for retaining a disposable sanitation sheet.

Another such device is described in U.S. Pat. No. 4,121,866, which illustrates a device to facilitate the picking up and disposing of animal feces comprising a handle which is connected to a ring shaped supporting device having an enlarged aperture therein, a plastic bag to be inserted through the enlarged aperture.

The foregoing references indicate that it is known to use devices to assist in the clean up and disposal of canine waste. However, there is no known device that comprises a unique structural configuration of the present invention. The unique structure combined with the ease of sanitary use gives the instant invention advantages over conventional devices. Other advantages of the present invention over conventional waste collection devices will also be rendered evident.

SUMMARY OF THE INVENTION

It is an object of the present invention to provide a canine waste collection device, wherein a disposable paper element (such as paper towel or the like) is utilized in conjunction with a waste collection device comprising a handle and frame to collect waste, and wherein the frame comprises means for removably securing the disposable paper element thereto.

It is another object of the present invention to provide a method that enables sanitary disposal of collected canine waste, wherein the collected waste and the used paper towel can be separately disposed using a toilet.

In one aspect of the present invention, a waste collection device for use with a disposable paper element comprises:
 a handle; and
 a frame member, connected to one end of the handle, wherein the frame member comprises a slotted member for insertably receiving and securing a portion of the disposable paper element, and wherein the frame member is configured for foldably receiving the disposable paper element to form a pouch for receiving waste.

In another aspect, the frame member comprises a first member extending from the handle and a second member extending from the handle, and wherein the slotted member is connected to one end of the first and second members.

In yet another aspect, the handle comprises a notch for insertably receiving a portion of the paper element to secure the paper element on the frame member to make a secure pouch for collecting the waste.

In another aspect, the waste collection device comprises an elongate extension handle attachable to the handle. Preferably, the elongate extension handle and the handle form an angle of about 30 degrees to about 60 degrees when attached.

In yet another aspect, the canine waste collection device further comprises a paper element having a substantially rectangular shape.

These and other objects, aspect, features and advantages of the present invention will be described or become apparent from the following detailed description of preferred embodiments, which is to be read in connection with the accompanying drawings.

DETAILED DESCRIPTION OF PREFERRED EMBODIMENTS

With reference now to the drawings, canine waste collection appliances and waste disposal methods embodying principles and concepts of the present invention will be described.

Figure 1:
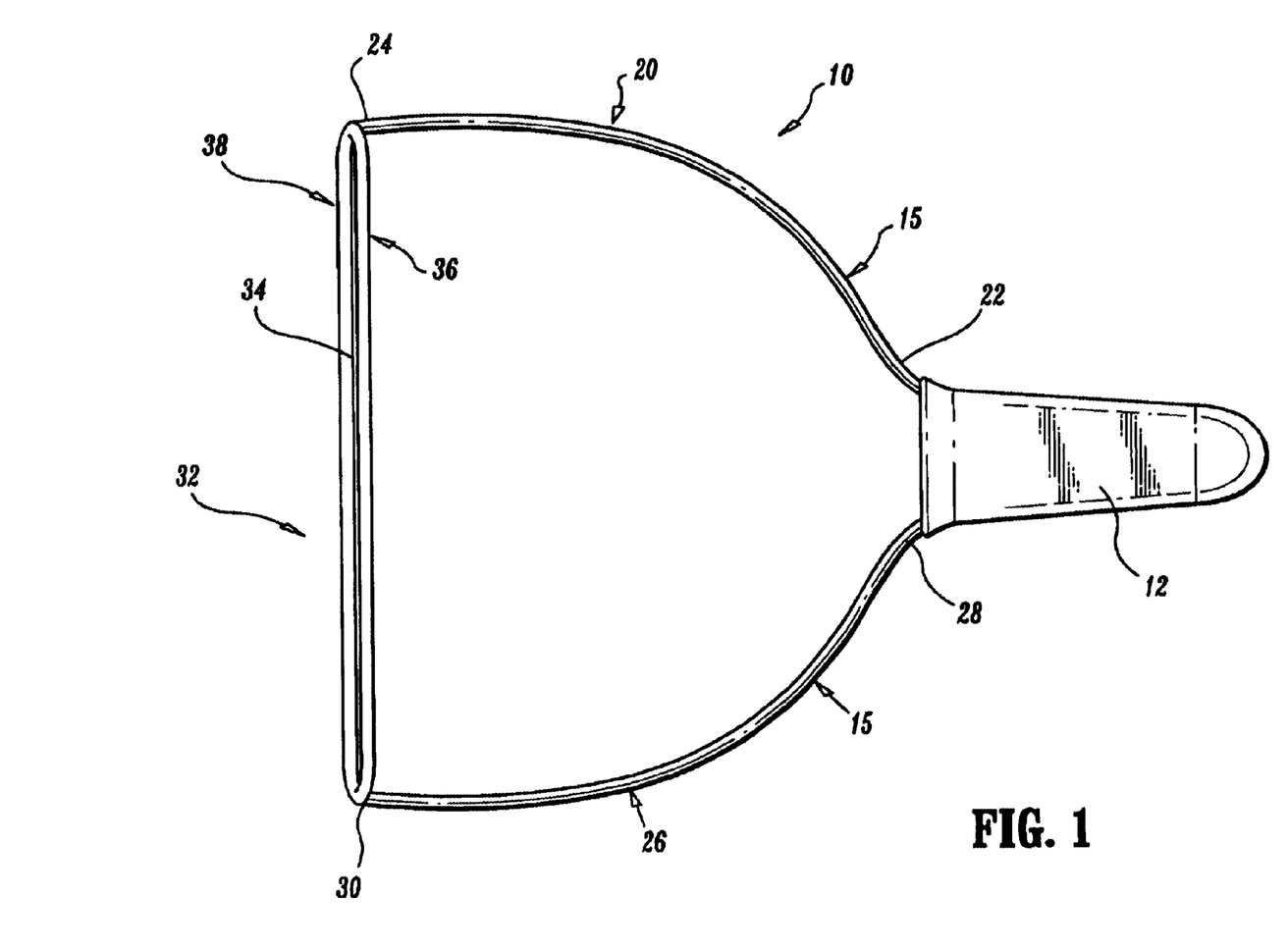
FIG. 1 is a view showing a canine waste collection device according to one embodiment of the present invention.

FIG. 1 illustrates a canine waste collection appliance 10 according to an embodiment of the present invention. The canine waste collection appliance 10 comprises a handle 12 connected to a frame 15. The frame 15 comprises a right portion 20 and a left portion 26. The right portion 20 comprises a right portion proximal end 22 and a right portion distal end 24. The left portion 26 comprises a left portion proximal end 28 and a left portion distal end 30. An end portion 32 is provided intermediate the right portion distal end 24 and the left portion distal end 30. The end portion 32 comprises a thin slot 34 that generally traverses the length of the end portion 32. The thin slot 34 is defined as the opening intermediate the end portion upper member 36 and the end portion lower member 38.

The frame 15 and handle 12 may be constructed of wire, wood, plastic or any other material that has appropriate material properties.

Figure 2:
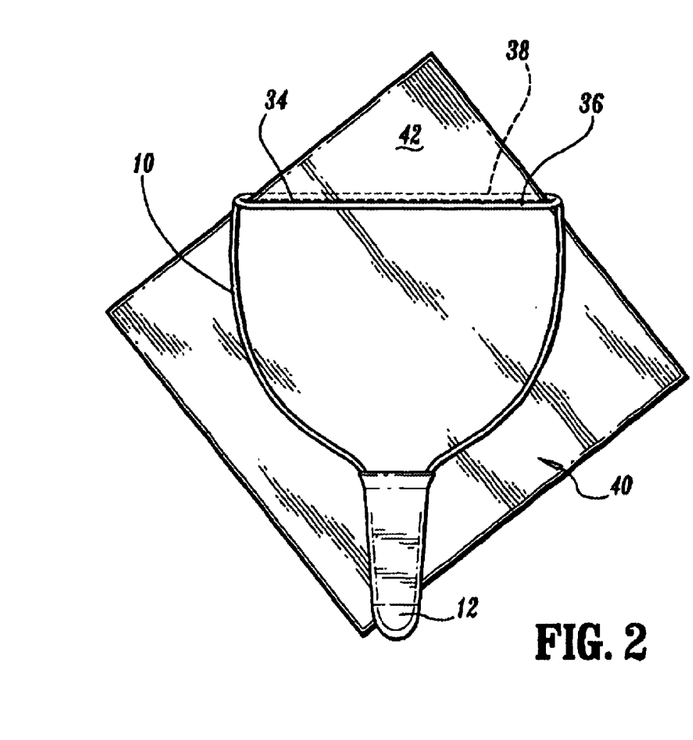
FIG. 2 is a view showing a first step of a process of loading a paper towel into the canine waste collection device of FIG. 1.

FIGS. 2-6 demonstrate a method of loading a paper towel 40 into the appliance 10. Referring now specifically to FIG. 2, a first step of loading the paper towel 40 into the appliance 10 is shown. A first portion 42 of the paper towel 40 is threaded through the thin slot 34, leaving a generally triangular portion (first portion 42) remaining above the thin slot 34. The remaining portion 44 the paper towel 40 is designated as 44. Therefore, the remaining portion 44 and first portion 42 comprise the entire paper towel 40.

Figure 3:
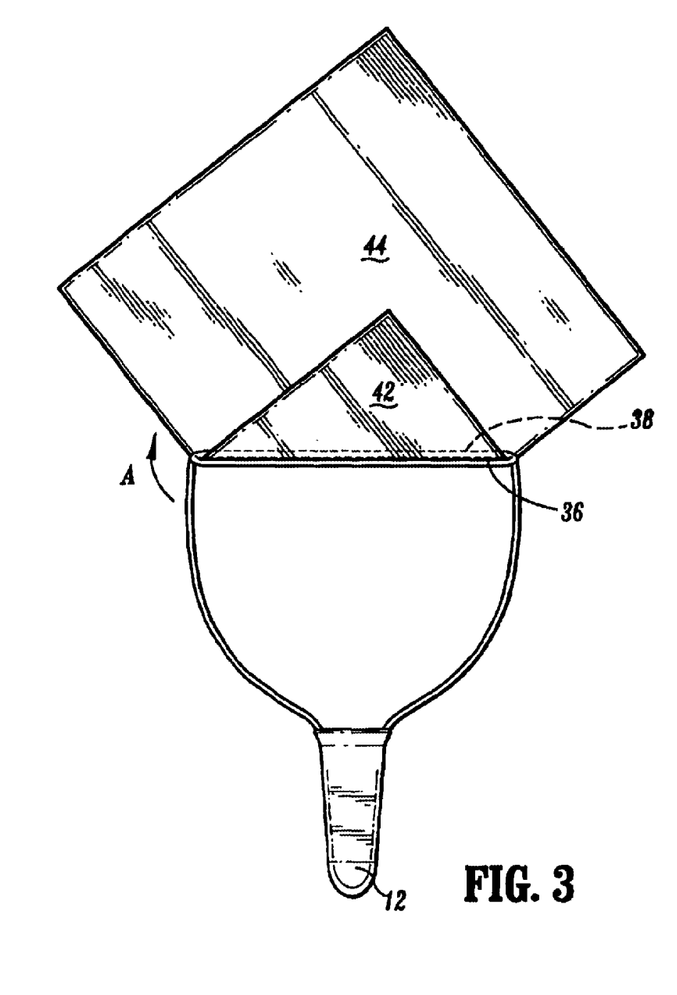
FIG. 3 is a view showing a second step of the process of loading a paper towel onto the canine waste collection device of FIG. 1.

FIG. 3 shows a second step of loading the paper towel 40 into the appliance 10. The remaining portion 44 is being rotated about the end portion lower portion 38 as indicated generally by arrow A. A first fold line 52 of sorts (best seen in FIG. 7) is formed on the paper towel 40 approximately marking the demarcation of the first portion 42 and the remaining portion 44.

Figure 4:
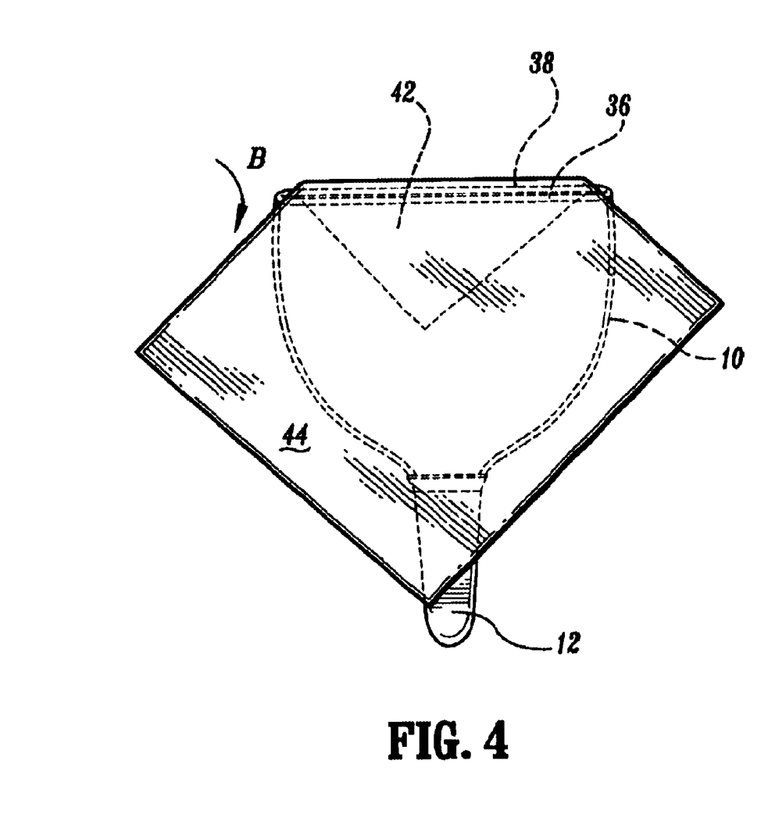
FIG. 4 is a view showing a third step of the process of loading a paper towel onto the canine waste collection device of FIG. 1.

FIG. 4 shows the third step of the paper towel 40 being loaded into the appliance 10. The remaining portion 44 is now rotated about both the end portion lower portion 38 and the end portion upper portion 36 as indicated generally by arrow B and then folded atop the appliance 10, obscuring the appliance 10 from view and creating a second fold line 54 of sorts (best seen in FIG. 7). At this step in the loading process, the remaining portion 44 of the paper towel 40 and a portion of the handle 12 is all that can be seen.

Figure 5:
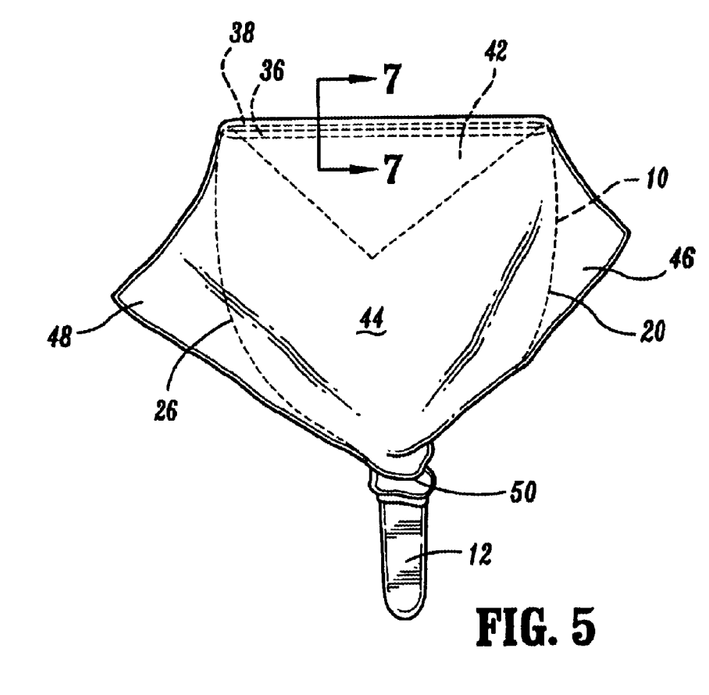
FIG. 5 is a view showing a fourth step of the process of loading a paper towel onto the canine waste collection device of FIG. 1.
Figure 6:
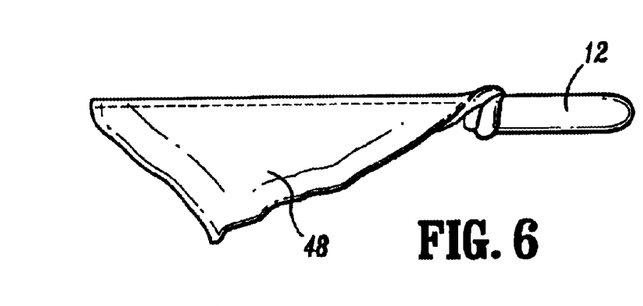
FIG. 6 is a side view showing a paper towel fully loaded on the canine waste collection device of FIG. 1.

FIG. 5 shows a fourth and final step of loading the paper towel 40 onto the appliance 10. The remaining portion 44 of the paper towel 40 has a second portion 46 which hangs over the right portion 20 of the appliance 10 and a third portion 48 which hangs over the left portion 26 of the appliance 10. A remaining portion 44 of the paper towel 40 has a fourth portion 50 that is generally wrapped about the handle 12 of the appliance 10 proximal the intersection of the handle 12 and the frame 15. FIG. 6 shows a side view showing how the third portion 48 (and second portion 46) hang over the left portion 26 and the right portion 20 of the appliance 10.

Figure 7:
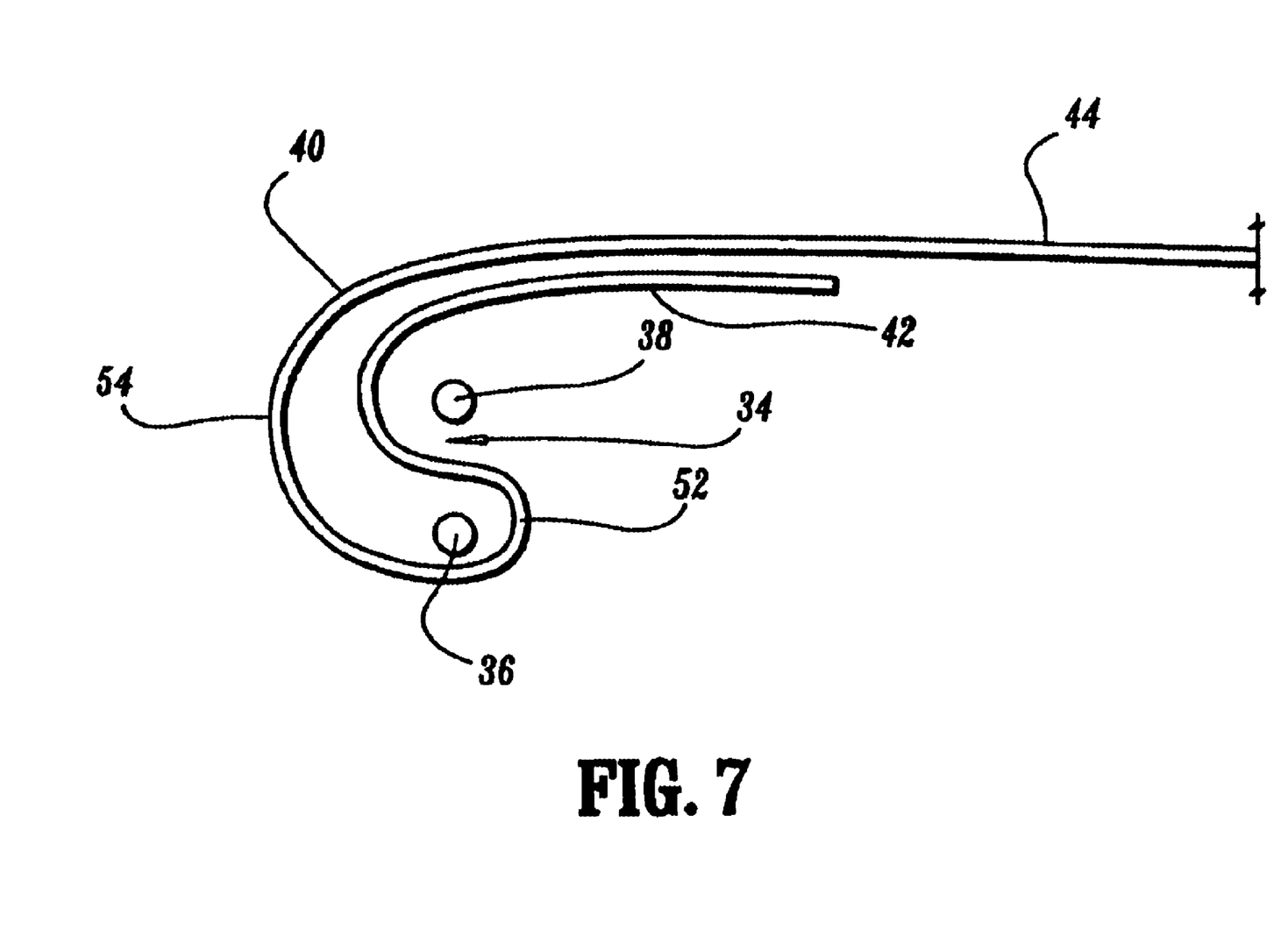
FIG. 7 is a cutaway view taken along line 7-7 of FIG. 5.

FIG. 7 shows a cutaway view along line 7-7 of FIG. 5. Thin slot 34 is located intermediate the end portion lower member 36 and the end portion upper member 38. A paper towel 40 is shown threaded through the thin slot 34 with the general relationship between the first portion 42 and the remaining portion 44. The first fold line 52 and second fold line 54 are shown. By threading the paper towel 40 through the thin slot 34 in the above fashion, the paper towel 40 is essentially locked into the appliance 10. At this point, the appliance 10 is ready for use.

In preparation for defecation, the dog rounds it back then squats and defecates. This is a natural procedure for dogs. Prior the defecation the appliance 10 is placed on the ground immediately under the appropriate end of the squatting dog. The dog then defecates into the paper towel that has been loaded onto the appliance 10 as discussed above.

The paper towel with the feces located thereon is released from the appliance 10 in the following manner. With the appliance on the floor, the right corner of the paper towel and the left corner of the paper towel are brought together over and about the central area (where the feces is located). Then the third corner of the paper towel, which is located about the handle of the appliance, is brought into contact with the right corner and the left corner of the paper towel. The first, second and third corners of the paper towel are held by one hand, forming a pouch with the feces there within. The three corners of the paper towel are then raised off the ground with one hand. At this point, with the other hand, the individual will hold the appliance by the handle, point the handle down towards the ground and move it in a forward direction under the pouch. This pulls the remaining corner of the paper towel from the slot on the appliance, releasing the last corner of the paper towel. This fourth corner of the paper towel would then be placed with the other corner elements of the paper towel, and the used towel covering the waste is ready to be disposed. By using this method, the waste is confined to the paper towel without coming into contact with the appliance or the person using the appliance.

At the point where the paper towel is released from the appliance, it is ready to be disposed. A preferred manner of disposal comprises flushing the feces and the used paper towel down a flush toilet. In this case, the waste material would be dumped from the paper towel into the toilet bowl followed by the open paper towel. The toilet is prevented from clogging by separating the feces from the paper towel.

Other readily apparent methods of disposing of the waste and the paper towel can be readily envisioned. The use of trash receptacles, portable non-flushing toilets, outhouses, plastic trash bags, etc., may all be used without deviating from the proposed use of the canine waste collection appliance 10.

Figures 8, 10:
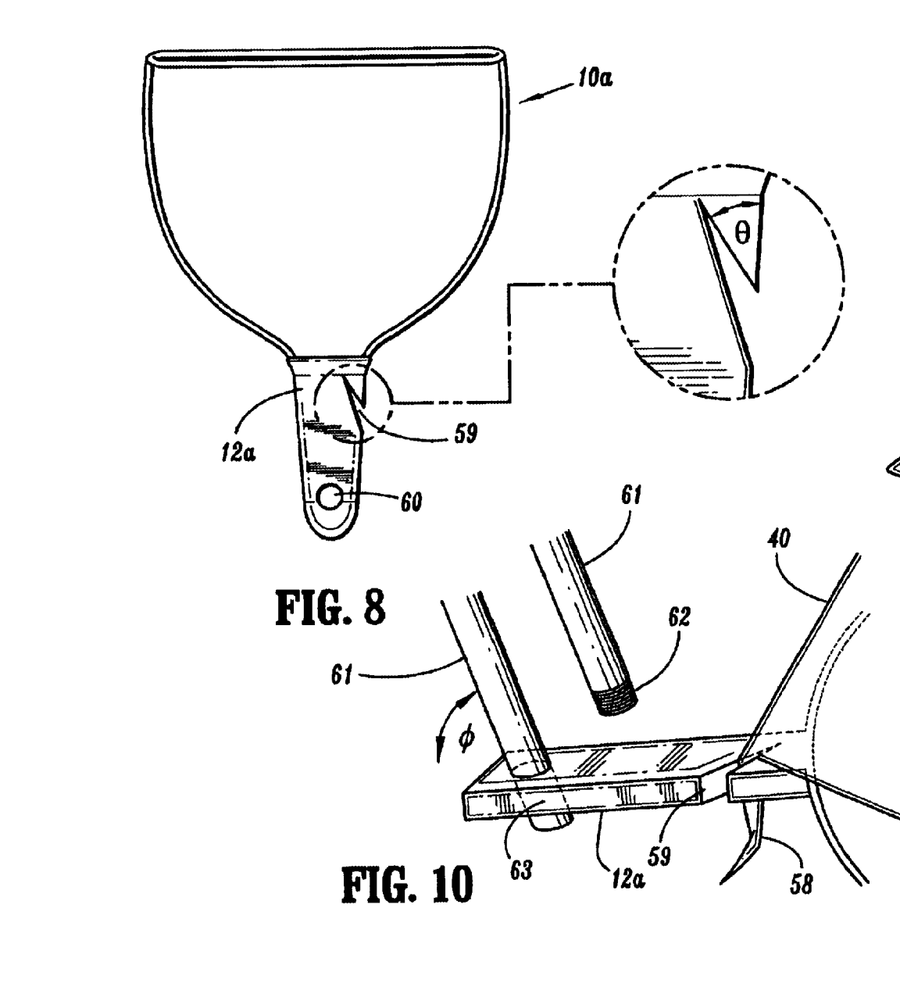
FIG. 8 is a view showing a canine waste collection device according to another embodiment of the present invention.
FIG. 10 is a side view of the canine waste collection device of FIG. 8 illustrating the use of an extension handle.

FIG. 8 is a diagram that illustrates a canine waste collection device according to another embodiment of the present invention. In the exemplary embodiment of FIG. 8, a canine waste collection device 10a is similar to the device 10 described above with reference to FIG. 1, except that the canine waste collection device 10a comprises a handle 12a comprising a retention notch 59, for insertably receiving and frictionally engaging a twisted end portion 58 of paper element 40 to temporarily secure the paper element 40 in place. The handle 12a further comprises an aperture 60 for insertably receiving an elongate extension handle 61.

Figure 9:
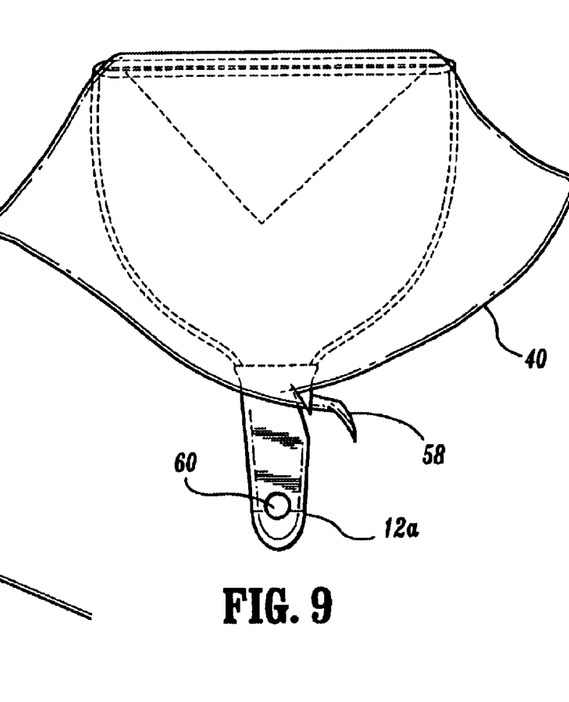
FIG. 9 is a view showing a step of a process of loading a paper towel onto the canine waste collection device of FIG. 8.

More specifically, as shown in FIG. 9, the retention notch 59, which comprises a tapered notch at an angle e of approximately 20 degrees from the handle 12a, accepts a twisted end 58 of the paper element 40 to temporarily secure the end of the paper element 40 to the frame. This is an alternative to the embodiment and method shown in FIG. 5 wherein the fourth portion 50 of the paper element 40 is generally wrapped about the handle 12 of the appliance 10 proximal the intersection of the handle 12 and the frame 15.

FIG. 10 is a side view of the canine waste collection device of FIG. 8 illustrating the use of the extension handle 60. In one embodiment, the elongate extension handle 61 comprises a male threaded end 62, wherein the elongate extension handle 60 is attachable to the handle 12a by screwing the male threaded end 62 into a corresponding female threaded aperture 60 of the handle 12a. In another embodiment, the elongate extension handle 60 is attachable to the handle 12a by inserting the elongate extension handle 60 into a non-threaded aperture 60 of handle 12a and then securing the extension handle 61 to the handle 12a via a metal screw 63 on one side of handle 12a. It is to be understood that any suitable means of fastening the elongate extension handle 61 to the handle 12a may be employed. In a preferred embodiment, the elongate extension handle 61 is about 30 to 36 inches in length. Further, when secured, an angle $\phi$ formed between the elongate extension handle 61 and handle 12a is in the range of about 30 degrees to about 60 degrees. Further, the elongate extension handle 61 is preferably tubular, with a diameter in the range of about ⅝ inches to about ¾ inches.

Figure 11:
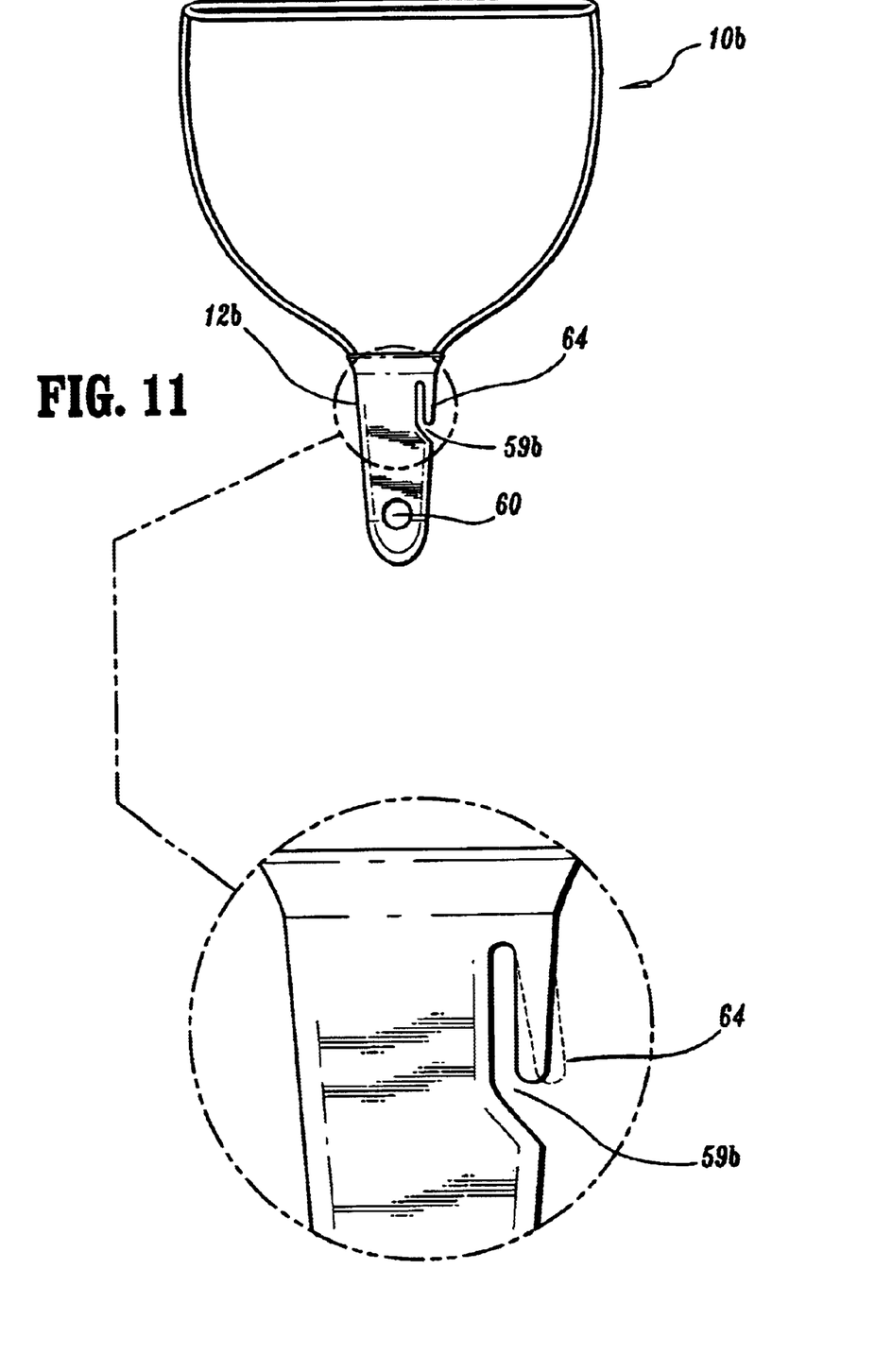
FIG. 11 is a view showing a canine waste collection device according to another embodiment of the present invention.

FIG. 11 is a diagram that illustrates a canine waste collection device according to another embodiment of the present invention. In the exemplary embodiment of FIG. 11, a canine waste collection device 10b is similar to the device 10a described above, except that a retention notch 59b of handle 12b comprises a flexible portion 64 which flexes away from the handle 12b (as shown by the dotted flexible portion 64) when an end portion of a paper element is inserted into the notch 59b and then compresses back to secure the end portion of the paper element. Preferably, the flexible portion 64 comprises a structural integrity that enables the flexible portion 64 to provide spring-like characteristics and provide sufficient compression force to retain the end portion of the paper element that is inserted in the notch 59b.

It is apparent from the above that the present invention accomplishes all of the objectives set forth by providing a canine waste collection device comprising a handle and frame, wherein the frame comprises means to removably secure a paper towel thereto.

There are various advantages of a canine waste collection device according to the present invention. For example, one advantage is a simplified design that comprises a slot located on the end portion of the frame member, which secures the paper towel to the appliance without the use of springs, clamps or other complicated securing means. The slot anchors the paper towel in a secure, tight position. Further, the manner in which the paper towel is affixed to the frame of the appliance prevents waste from coming into contact with the appliance per se. This is advantageous as it keeps the appliance clean and sanitary. Further, the manner that the paper towel is affixed to the frame permits the waste, and subsequently the paper towel, to be disposed of in a completely sanitary and simple fashion. By disposing of the waste in this manner, no feces remain on the grass or road. Further, there are no plastic bags to dispose of, which minimizes odor and the storage of such waste material unit is ultimately taken to a landfill.

It is to be understood that the term paper towel comprises any type of paper towel, such as those paper towels that may be obtained commercially under any of a host of brand names. In one embodiment of the invention, a paper towel that measures about 11 inches by 13 inches is preferably used. However, it is to be understood that any sheet material with the appropriate strength, flexibility, and dimensions may be employed with the appliance. Moreover, any form of paper towel that does not break down or loose structural integrity when wetted, is preferably employed with a canine waste disposal device according to the present invention.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention. Indeed, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the purposes of the present invention. It is important, therefore, that the claims be regarded as including such equivalent constructions insofar as they do not depart from the spirit and scope of the present invention. All such changes and modifications are intended to be included within the scope of the invention as defined by the appended claims.

What is claimed is:

1. A waste collection device for use with a disposable paper sheet, the device comprising:

a handle; and a frame member, connected to one end of the handle, wherein the frame member comprises a slotted portion for insertably receiving a portion of the disposable paper sheet, and wherein the frame member is configured such that the disposable paper sheet is folded around the frame member to form a pouch for receiving waste, wherein the handle comprises a notch for insertably receiving a portion of the paper sheet to secure the paper sheet.

2. The device of claim 1, wherein the frame member comprises a first member extending from the handle and a second member extending from the handle, and wherein the slotted portion is connected to one end of the first and second members.

3. The device of claim 1, wherein the notch comprises a flexible member that applies a compression force to secure the paper sheet.

4. The device of claim 1, further comprising an elongate extension handle attachable to the handle.

5. The device of claim 4, wherein the elongate extension handle and the handle form an angle of about 30 degrees to about 60 degrees when attached.

6. The device of claim 1, wherein the handle is substantially perpendicular to the slotted portion of the frame.

7. The device of claim 1, further comprising a paper sheet having a substantially rectangular shape.

8. The device of claim 1, further comprising a paper sheet, wherein the paper sheet is flushable.

9. The device of claim 1, further comprising flushable sheet material.

10. A canine waste collection device for use with a disposable paper sheet, comprising:

a handle comprising a top portion and a bottom portion;

a first frame member comprising a proximal element and a distal element, the proximal element being connected to the handle;

a second frame member comprising a proximal element and a distal element, the proximal element being connected to the handle; and a third frame member comprising a thin slot, wherein the thin slot extends substantially the length of the third frame member, wherein the third frame member is connected to the distal elements of the first and second frame member, wherein the third frame member receives a portion of the disposable paper sheet through the thin slot, and wherein the disposable paper sheet is folded around the first, second and third frame members to form a pouch for receiving waste.

11. The device of claim 10, wherein the handle is substantially perpendicular to the third frame member.

12. The device of claim 10, further comprising a paper sheet comprising a first portion received in the thin slot, the paper sheet folded atop the thin slot, the paper sheet comprising a second portion folded about the first frame member, the paper sheet comprising a third portion folded about the second frame member, the paper sheet comprising a fourth portion folded about an intersection of the handle with the first and second frame members, wherein the paper sheet is substantially rectangular, having a first side, a second side, a third side and a fourth side, a first corner located at the intersection of the first side with the second side, a second corner located at the intersection of the second side with the third side, a third corner located at the intersection of the third side with the fourth side, and a fourth corner located at the intersection of the fourth side with the first side.

13. The device of claim 10, wherein the handle comprises a notch for insertably receiving a portion of the paper sheet to secure the paper sheet.

14. The device of claim 13, wherein the notch comprises a flexible member that applies a compression force to secure the paper sheet.

15. The device of claim 10, further comprising an elongate extension handle attachable to the handle.

16. The device of claim 15, wherein the elongate extension handle and the handle form an angle of about 30 degrees to about 60 degrees when attached.

17. The device of claim 10, further comprising a paper sheet, wherein the paper sheet is flushable.

18. The device of claim 10, further comprising flushable sheet material.

* * * * *